US010974634B2

(12) United States Patent
Ceglarek et al.

(10) Patent No.: US 10,974,634 B2
(45) Date of Patent: Apr. 13, 2021

(54) CUSHION SUPPORT FOR A VEHICLE SEAT

(71) Applicant: Faurecia Autositze GmbH, Stadthagen (DE)

(72) Inventors: Piotr Ceglarek, Katowice (PL); Robert Grzeslo, Swidnica (PL)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 16/591,894

(22) Filed: Oct. 3, 2019

(65) Prior Publication Data

US 2020/0139867 A1  May 7, 2020

(30) Foreign Application Priority Data

Nov. 6, 2018 (DE) .......................... 102018127626.5

(51) Int. Cl.
*B60N 2/90* (2018.01)
*B60N 2/64* (2006.01)
*B60N 2/70* (2006.01)

(52) U.S. Cl.
CPC .............. *B60N 2/914* (2018.02); *B60N 2/64* (2013.01); *B60N 2/70* (2013.01)

(58) Field of Classification Search
CPC ............. B60N 2/914; B60N 2/64; B60N 2/70
USPC ........................................ 297/284.1–284.6
See application file for complete search history.

(56) References Cited

U.S. PATENT DOCUMENTS

| 5,135,282 | A * | 8/1992 | Pappers | B60N 2/914 |
| | | | | 297/284.3 |
| 5,280,997 | A * | 1/1994 | Andres | A47C 7/467 |
| | | | | 297/284.9 |
| 5,711,575 | A * | 1/1998 | Hand | A47C 7/425 |
| | | | | 297/284.6 |
| 5,975,629 | A * | 11/1999 | Lorbiecki | B62J 1/12 |
| | | | | 297/200 |
| 6,273,810 | B1 * | 8/2001 | Rhodes, Jr. | A47C 4/54 |
| | | | | 454/120 |
| 6,916,300 | B2 * | 7/2005 | Hester | A61H 23/04 |
| | | | | 297/284.6 |
| 7,120,984 | B2 * | 10/2006 | Rutsch | B29C 45/14221 |
| | | | | 29/527.1 |
| 9,896,003 | B2 * | 2/2018 | Tamura | B60N 2/914 |
| 2005/0173957 | A1 * | 8/2005 | Schwarzbich | B60N 2/66 |
| | | | | 297/284.4 |

(Continued)

FOREIGN PATENT DOCUMENTS

DE    102009048734 A1    9/2011

*Primary Examiner* — Mark R Wendell
(74) *Attorney, Agent, or Firm* — Laurence P. Colton; Smith Tempel Blaha LLC (57) ABSTRACT

A cushion support for an at least partially resilient shaped part of a vehicle seat, in particular a back cushion support, having a support means designed for holding up and/or supporting the shaped part at least in regions and at least one expansion body designed for reversibly displacing at least a region of the shaped part, the cross section of which body can be changed by introducing and discharging a fluid. The support means is a mat arrangement which can be mounted in a frame of the vehicle seat and has two superimposed flexible mat layers, in particular formed by a textile, at least in regions, the expansion body being arranged between the mat layers.

6 Claims, 8 Drawing Sheets

(56) References Cited

U.S. PATENT DOCUMENTS

| | | | |
|---|---|---|---|
| 2007/0236071 A1* | 10/2007 | Fujita | B60N 2/7058 297/452.5 |
| 2010/0207431 A1* | 8/2010 | Petzel | B60N 2/643 297/180.16 |
| 2010/0276973 A1* | 11/2010 | Zenk | B60N 2/914 297/284.3 |

* cited by examiner

CUSHION SUPPORT FOR A VEHICLE SEAT

STATEMENT OF RELATED APPLICATIONS

This application claims the benefit of and priority on German Patent Application No. 10 2018 127 626.5 having a filing date of 6 Nov. 2018.

BACKGROUND OF THE INVENTION

Technical Field

The invention relates to a cushion support for an at least partially resilient shaped part of a vehicle seat, in particular a back cushion support, comprising a support means designed for holding up and/or supporting the shaped part at least in regions and at least one expansion body designed for reversibly displacing at least a region of the shaped part, the cross section of which body can be changed by introducing and discharging a fluid, or comprising a support means designed for holding up and/or supporting the shaped part at least in regions. Furthermore, the invention relates to a backrest part for a vehicle seat comprising such a cushion support according to the features in claim 10 Backrest part (100, 100.1) for a vehicle seat, comprising a cushion support as disclosed herein and to a vehicle seat comprising a thus equipped backrest as disclosed herein, which is in particular pivotally mounted on the seat part.

Prior Art

Seating arranged in vehicles (vehicle seat) may be formed as a single seat or as a bench seat. Equipped with one or more adjustment functions, these allow for individual adaptation to the person sitting in the seat. The extent of the adjustability depends significantly on the equipment variant and the arrangement of the vehicle seat in the first, second or another row of seats. Therefore, the front seats usually have most or even all of these adjustment functions, while the seat row(s) behind may, by contrast, have only limited or sometimes no adjustability.

Examples of possible adjustment functions are those for manually changing the inclination of the backrest part (inclination adjustment) and/or for changing the position of the entire vehicle seat in the longitudinal direction of the vehicle (longitudinal adjustment). Other adjustment functions relate to the shape and/or rigidity of the seat-surface region of a vehicle seat that comes into contact with a person, such as a backrest part provided for supporting the back and/or the seat part designed for sitting. Usually, in this case expansion bodies serve to displace resilient shaped parts arranged in the seat-surface region at least in regions in order to obtain the most comfortable possible contour for the person in question. A typical example of this is a lumbar support located in the backrest part.

Owing to the resiliently designed shaped parts of a vehicle seat, these require suitable support in the form of a cushion support. For the purpose of lower suspension, such cushion supports may have straps or wave springs mounted in a frame, for example, which serve to hold up and/or support the relevant shaped part. In this way, the forces introduced by a person using the vehicle seat can be transmitted to the supporting parts of the vehicle seat, from which point they are passed into the vehicle structure. DE 10 2009 048 734 A1 discloses a seat cushion for a vehicle seat which comprises a resilient shaped part comprising a carrier element which is foamed onto the rear face of said shaped part. An expansion body which can be supplied with compressed air by means of an air supply is arranged between the carrier element and the shaped part. The expansion body is used for reversibly displacing at least a region of the shaped part by the cross section thereof being changed by introducing and discharging a fluid. The carrier element, which is made of a reinforced non-woven material, for example, mechanically supports the shaped part, and it transmits the force from the seat cushion into a support of the vehicle seat.

The support has mutually spaced elements which are spanned by the carrier element. The combination of the carrier element and the support forms a support means for the shaped part. In particular, due to the reinforced configuration of the carrier element, the cross-sectional change of the expansion body acts only in the direction of the resilient shaped part in this case, while the support means serves as a counter-support.

A structure of this kind requires a plurality of interacting components to ensure the required support and adjustability of the relevant shaped part. In addition to the corresponding complexity of manufacturing and assembly, the individual components require sufficient installation space and add up to a corresponding total weight.

BRIEF SUMMARY OF THE INVENTION

Against this background, the problem addressed by the present invention is to develop an adjustable cushion support, in particular having a shape-change function of the above-mentioned type, as well as a backrest part equipped therewith and a vehicle seat comprising a backrest part of this kind, such that overall more cost-effective manufacturing is possible while saving weight and installation space at the same time.

According to the invention, the solution to this problem consists in a cushion support for an at least partially resilient shaped part of a vehicle seat, in particular a back cushion support, comprising a support means designed for holding up and/or supporting the shaped part at least in regions and at least one expansion body designed for reversibly displacing at least a region of the shaped part, the cross section of which body can be changed by introducing and discharging a fluid, characterized in that the support means is a mat arrangement which can be mounted in a frame of the vehicle seat and comprises two superimposed flexible mat layers, in particular formed by a textile, at least in regions, the expansion body being arranged between said mat layers, and/or a cushion support for an at least partially resilient shaped part of a vehicle seat, in particular a back cushion support, comprising a support means designed for holding up and/or supporting the shaped part at least in regions, characterized in that the support means can be mounted in a frame of the vehicle seat by incorporating at least one pneumatic muscle, the pneumatic muscle being reversibly changeable in its extension by introducing and discharging a fluid. Furthermore, this problem is solved by a backrest part for a vehicle seat, comprising a cushion support as described herein and by a vehicle seat comprising a seat part and a backrest part, as described herein, which is in particular pivotally mounted on the seat part.

Advantageous embodiments are found in the respective dependent claims.

According to the invention, it is proposed that the support means is a mat arrangement which can be mounted in a frame of the vehicle seat and comprises two superimposed flexible mat layers at least in regions, the expansion body being arranged between said mat layers.

The resulting advantage is considered to be a very simple construction of the cushion support, which now functions entirely without additional support. The arrangement of the expansion body between the mat layers should in particular be noted here, since its active cross-sectional increase in addition to increasing spacing of the mat layers at the same time results in tightening of the mat arrangement. This is caused by the increasing curvature of the mat layers in regions, which results in corresponding shortening due to the merely flexible but at least largely non-resilient design of said layers in the mat layer plane.

As a result, the displacement of the shaped part in regions that is noticeable during the inflation of the expansion body as a protrusion of a held-up and/or supported shaped part is supported since the shortening of the mat arrangement counteracts any potential sagging of the mat arrangement due to the weight of a seat occupant. Thus, the seat hardness is adjustable, because the shortening is perceived by the seat occupant as hardening or stiffening at least in regions. Overall, the cushion support according to the invention thus requires less installation space and has a significantly lower weight.

The at least one expansion body may for example be made of or comprise a urethane-based thermoplastic elastomer.

Particularly preferably, the mat layers can be made of a textile.

This may be a fabric having natural and/or synthetic polymer fibers. Of course, fibers made of inorganic materials and combinations of that which is mentioned above are also conceivable. Depending on the strength and elongation-behavior requirements of the material, this may for example also be made of or contain high-strength fibers, such as aramid.

According to a preferred embodiment of the invention, the mat layers of the cushion support form at least one tubular cavity therebetween, in which the expansion body is arranged. Alternatively or additionally, the cavity may also be designed to be chamber-shaped. The example of a rectangular cavity is understood to be a chamber-like design of its three-sided or four-sided closed form, while a tubular design has, by contrast, a shape that is only closed on two sides with opposite open ends. In both cases, two sides closing the cavity are opposite one another, such that a cross-sectional increase of the expansion body causes the above-described shortening of the mat arrangement by these sides approaching one another due to curvature.

The mat assembly may comprise connecting regions arranged on two of its mutually opposite longitudinal edges to make it easier to attach to the load-bearing structure of a car seat. In an advantageous manner, the mat arrangement can be at least indirectly connected to two mutually opposite carriers of the frame. The option of mounting the mat arrangement in the frame of a motor vehicle seat in this way allows it to be assembled with high process reliability and low complexity.

In principle, the two mat layers of the mat arrangement can be composed of individual parts or a single part, which is tubular, for example. Due to the flexible properties, the last-mentioned embodiment naturally has, in the slack state, two superimposed mat layers with two edge-side deflections for each fold. In the context of the invention, at least one of the longitudinal edges of the mat arrangement is formed by such a fold or a connection of the mat layers.

With a view to the design of the connecting regions, these can preferably be based on a single retaining rod per longitudinal edge. For this purpose, each of the connecting regions located on one of the two longitudinal edges can be formed by a deformed section of the retaining rod. Furthermore, individual openings may be provided on the longitudinal edges of the mat arrangement. The position of the openings per longitudinal edge and the position of the deformed portions of a retaining rod can be matched to one another in a particularly preferred manner such that the deformed portions of a retaining rod extend through the openings provided on a longitudinal edge at least in part. The deformed portions of a retaining rod are thus arranged in the openings in a longitudinal edge, while the in particular straight portions positioned between the deformed portions are supported from the inside on the portions of the longitudinal edges of the mat arrangement remaining between the openings. As a result, a design of the connecting regions that is extremely easy to implement and is durable is possible.

According to an advantageous embodiment of the invention, the expansion body may comprise at least one cut-out.

This means, for example, a portion that is cut out so as to be recessed relative to the circumferential contour of the expansion body.

Furthermore, it may be advantageous for the two mat layers to be interconnected in the region of this cut-out. Such a design contributes to making it simple to fix the expansion body in position between the mat layers. Furthermore, the shape and intensity of the adjustment of a seat surface region resulting from the partial displacement of a held-up and/or supported resilient shaped part can be preset in this way in a targeted manner. With each additional connection of the mat layers in the region of one expansion body, or a plurality of expansion bodies, additional curvature portions are generated with the cross-sectional increase thereof, which results in even more intense tightening or shortening of the mat arrangement, in particular in the plane between their connecting regions.

Particularly preferably, the mat layers can be connected by means of a seam produced by sewing. Of course, other types of connection are also conceivable here, such as gluing or welding, or combinations thereof. All these types of connection are considered suitable for forming a seam in the context of the invention.

With regard to the arrangement of retaining rods, the invention provides that the two mat layers are interconnected, in particular sewn to one another, along the retaining rods at least in portions by means of at least one seam in each case. Here, in a particularly preferred manner, the seam can extend in parallel with one of the longitudinal edges of the mat arrangement at least in portions, the retaining rods each being arranged between one of the longitudinal edges and a seam between the mat layers that is arranged in the region of this longitudinal edge. In this way, a hemstitch can be formed between the longitudinal edge and the seam in each case, in which each retaining rod is arranged. As a result, the retaining rods can be fixed in position between the mat layers in an advantageous manner.

Of course, a hemstitch of this kind can also be formed by simply folding the edge strip of a mat layer, which is fastened by the seam in the region of its free edge.

According to an alternative embodiment of the cushion support comprising a support means designed for holding up and/or supporting the shaped part at least in regions, the invention provides that the support means can be mounted in the frame of the vehicle seat by incorporating at least one pneumatic muscle. The pneumatic muscle is designed such that it is reversibly changeable in its extension by introducing and discharging a fluid.

The resulting advantage is changing only the rigidity of the support means, separately from a change in shape.

Owing to the increasing shortening of the pneumatic muscle, it can be tensioned to the same extent within the frame, which causes an immediate change in its rigidity.

The variability of its extension or length, in particular in the sense of the distance to be spanned between the frame and the support means, resulting from the known structure of a pneumatic muscle, is based on a change in the curvature of its delimiting material webs, similar to that already explained in connection with an expansion body.

The shortening thereof resulting from the inflation of the pneumatic muscle increases the tension within the support means, whereas the extension of the pneumatic muscle occurring when fluid is discharged results in the tension of the support means being released.

According to a preferred development, the support means of the alternative embodiment of the cushion support referred to above may be a support mat or a mat arrangement, as is explained in greater detail above in connection with the first embodiment of the cushion support. A support mat is understood to mean those embodiments which, for example, provide a mesh as lower suspension, as are commonly used in vehicle seats.

The cushion support according to the invention is extremely cost-effective to produce, in particular because of its low number of individual components. Owing to the use of a mat arrangement without any additional support, the cushion support has a significantly lower weight compared with conventional support mats. At the same time, the installation space required within a vehicle seat for the arrangement of the cushion support according to the invention is reduced to a minimum. As a result, the cushion support according to the invention thus combines the necessary support function of a cushion element with a desired adjustment function by means of at least one expansion body.

In this case, despite fewer components, the same functionality is achieved as in conventional designs. This also applies essentially to the alternative embodiment of the cushion support according to the invention, in which at least one of the passive spring elements normally used for connection to the frame of a vehicle seat is replaced with an active element in the form of a pneumatic muscle. By merely replacing such a spring element with a pneumatic muscle, apart from an arrangement for its actuation, no additional component is required in order to allow the adjustability of the rigidity of the support means. In this way, even small installation spaces are sufficient to produce adjustability along with a low weight.

The invention is also directed to a backrest part for a vehicle seat, comprising a cushion support according to the invention as described above.

According to a particularly preferred embodiment of the backrest part according to the invention, the cushion support thereof can be mounted in a frame of the backrest part by means of spring elements. According to another embodiment of the invention, alternatively or additionally, the cushion support can also be clamped into the frame of the backrest part by at least one pneumatic muscle. For this purpose, in an advantageous manner, the spring elements and/or pneumatic muscles are coupled in particular to connecting regions of the cushion support positioned on the longitudinal edges of the mat assembly, the free ends thereof being attached to one of two mutually opposite carriers of the frame. The spring elements allow for simple installation of the mat arrangement within the frame of the backrest part.

Due to the resilience of the spring elements, the shortening of the mat arrangement resulting from the inflation of the at least one expansion body can be compensated for in a suitable manner under tension of the spring elements. It is the responsibility of a person skilled in the art to select the required restoring force of the spring elements, and they will make the appropriate selection with regard to the maximum shortening of the mat arrangement in combination with the desired flexibility in relation to the weight of a person sitting on the seat. Of course, spring elements can also be used that are differently configured with respect to shape and/or restoring force in order to achieve an optimum result.

Lastly, the invention is also directed to a vehicle seat, in particular a motor vehicle seat, which comprises a seat part and a backrest part according to the invention arranged on this seat part, as described above.

In principle, the two above-mentioned design variants for the cushion support are compatible with each other, such that their respective configurations in the context of the invention can be adopted in the other embodiment in each case as a whole or at least in part.

BRIEF DESCRIPTION OF THE DRAWINGS

The invention will be explained in greater detail with reference to FIGS. 1-8 and the embodiments shown therein. In the drawings.

DETAILED DESCRIPTION OF PREFERRED EMBODIMENTS

Figure 1:
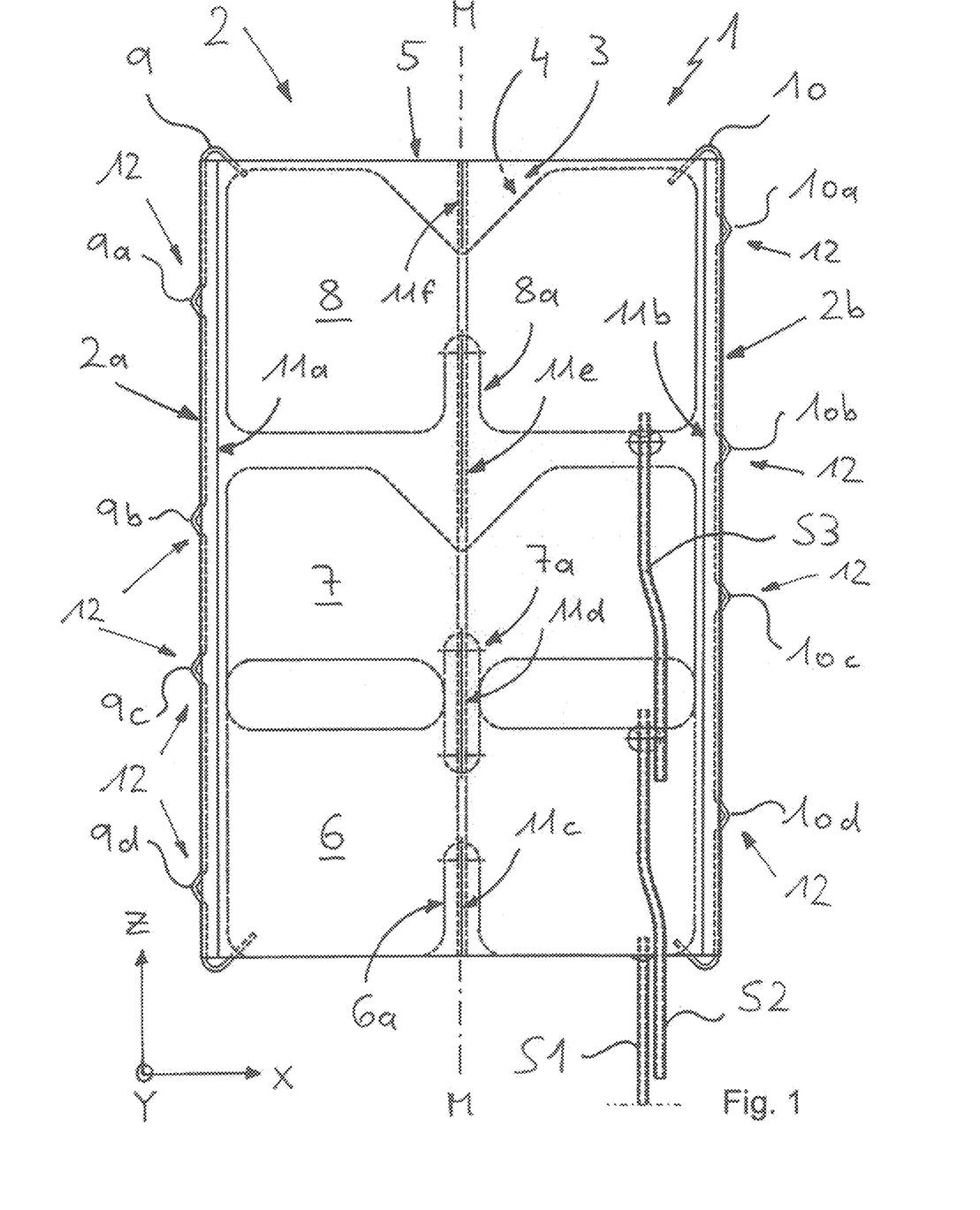
FIG. 1 shows a cushion support according to the invention.

FIG. 1 is a rear view of a cushion support 1 according to the invention. The cushion support 1 comprises a support means in the form of a mat arrangement 2 which extends within a plane spanning between a longitudinal direction X and a vertical direction Y. The mat arrangement 2 is used to (indirectly or directly) hold up or support a resilient shaped part (not shown in greater detail here) of a vehicle seat (not shown either).

For this purpose, the mat arrangement 2 comprises two flexible mat layers 3, 4 that are superimposed in a transverse direction Y and form a tubular cavity 5 therebetween extending in parallel with the vertical direction Z.

In the present case, three—there may also be more or fewer—expansion bodies 6-8 are arranged between the mat layers 3, 4 within this cavity 5. Each of the expansion bodies 6-8 that are superimposed in parallel with the vertical direction Z comprises a fluid-conducting connection with a hose S1-S3, through which a fluid in the form of air can be introduced into and discharged from the respective expansion bodies 6-8. The cross section of the respective expansion bodies 6-8, which inevitably changes in the process, is used for the desired adjustment of the supported shaped part, which is reversibly displaceable thereby in the region of the expansion bodies 6-8.

A retaining rod 9, 10 is arranged between the mat layers 3, 4 in each case in the region of the longitudinal edges 2a, 2b of the mat arrangement 2 which are mutually opposite in parallel with the longitudinal direction X. The longitudinal edges 2a, 2b themselves are formed by folds, which naturally result when superimposing the textile forming the mat layers 3, 4. Preferably, the textile in the region of the longitudinal edges 2a, 2b is wrapped around the respective retaining rods 9, 10 in one piece of material in order to form the two mat layers 3, 4. As can be seen, the two mat layers 3, 4 are interconnected along the retaining rods 9, 10 by means of a seam 11a, 11b formed by sewing, such that each of the retaining rods 9, 10 is arranged between the mat layers 3, 4 in a tubular portion defined by a longitudinal edge 2a, 2b and an associated seam 11a, 11b.

Some portions of the retaining rods 9, 10 are designed to form connecting regions 9a-9d, 10a-10d. In the present case, the connecting regions 9a-9d, 10a-10d of the two retaining rods 9, 10 are at different heights, but they can of course also each be arranged at the same height. As can be seen, the mat arrangement 2 has openings 12 located at its longitudinal edges 2a, 2b, through which the individual portions of the retaining rods 9, 10, which are formed into connecting regions 9a-9d, 10a-10d, pass. As can be seen, the two ends of each retaining rod 9, 10 are curved towards each opposite retaining rod 9, 10 such that each end portion of the retaining rods 9, 10 encloses an angle of 45° in the present case between them and the central portion of the associated retaining rod 9, 10. With regard to the expansion bodies 6-8, it becomes clear that they are preferably constructed so as to be mirror-symmetrical along a center line M, with them each having at least one cut-out 6a, 7a, 8a located in the region of the center line. As can be seen, the two mat layers 3, 4 are interconnected in the region of these cut-outs 6a, 7a, 8a by additional seams 11c-11f.

Figure 2:
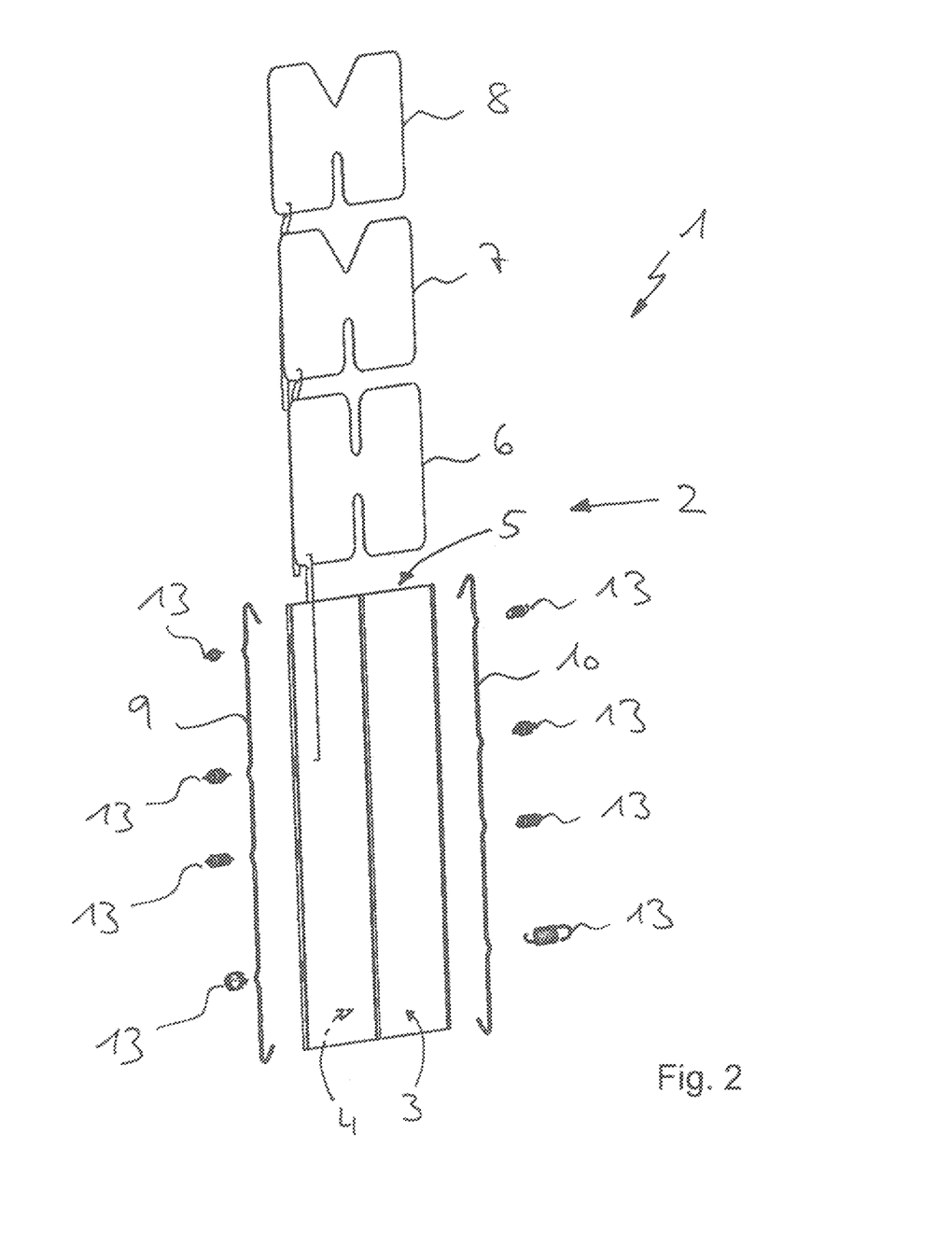
FIG. 2 is a perspective exploded view of the cushion support from FIG. 1.

FIG. 2 is an exploded view of the cushion support 1 from FIG. 1. Here, the expansion bodies 6-8 and the retaining rods 9, 10 are shown outside of the mat assembly 2.

In order to connect the cushion support 1 to the backrest part of a vehicle seat, individual spring elements 13 can also be seen, the arrangement of which will be explained in greater detail later.

Figure 3:
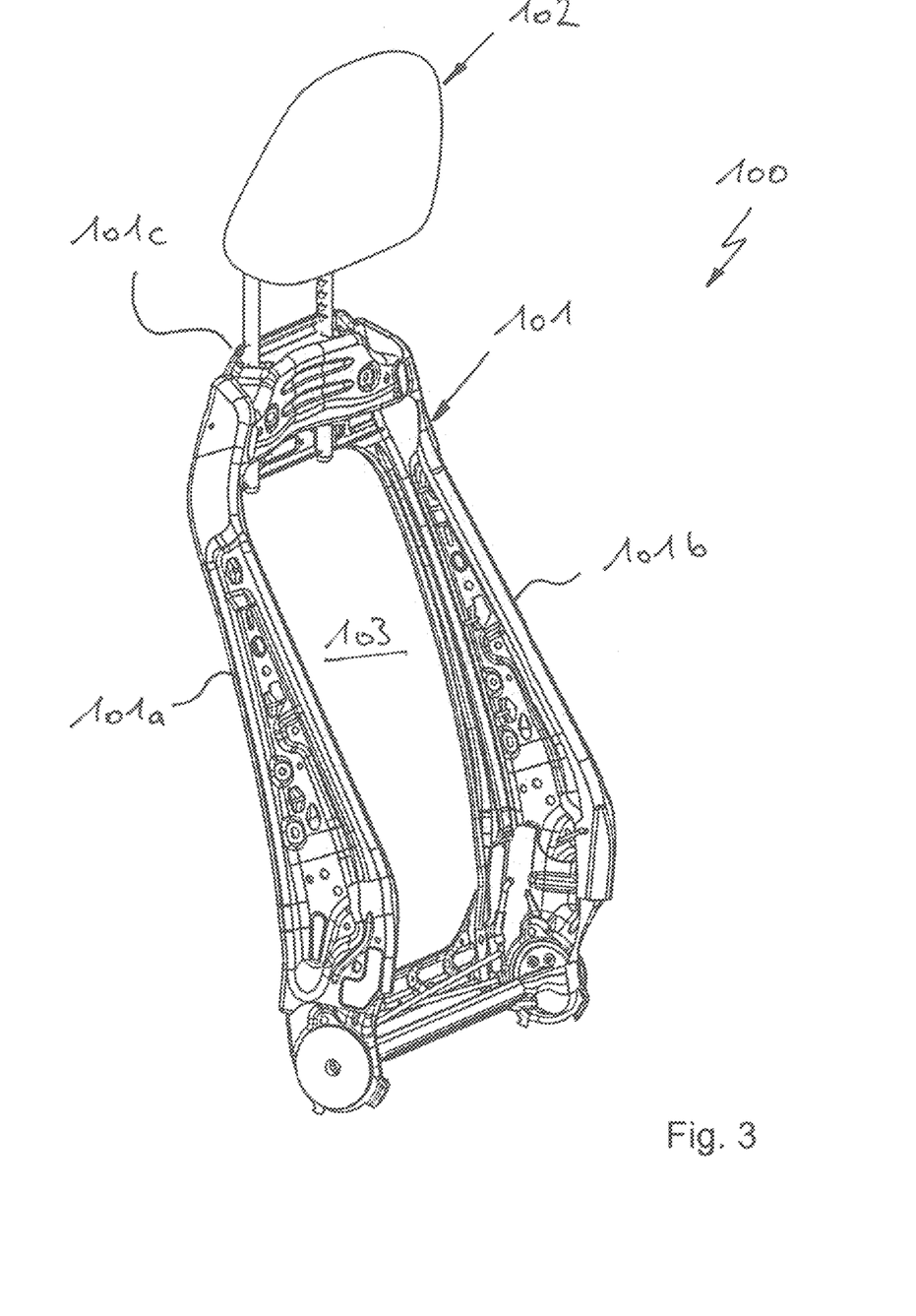
FIG. 3 is a perspective view of a frame of a backrest part according to the invention for a vehicle seat.

FIG. 3 shows a backrest part 100 of a vehicle seat, which in the present case substantially comprises a frame 101 having a headrest 102 mounted thereon.

The frame 101 has two mutually opposite carriers 101a, 101b, a strut 101c of the frame 101 interconnecting the two carriers 101a, 101b at their upper ends serving to movably support the headrest 102. In the present case, a resilient shaped part to be combined with the frame 101 in the form of a cushion would pass through the through-opening 103 located between the carriers 101a, 101b at the latest when it is loaded.

Figure 4:
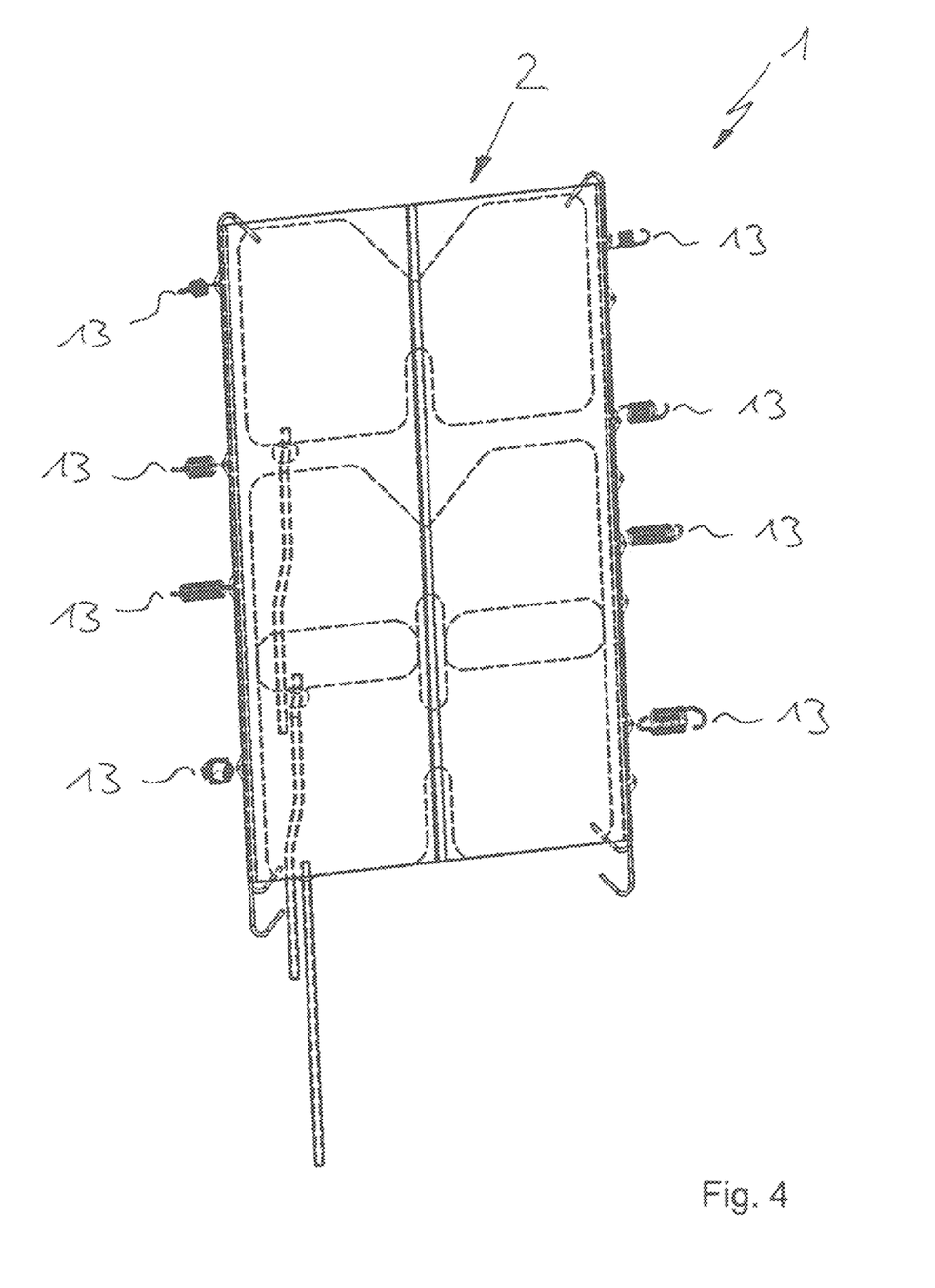
FIG. 4 is a perspective view of the cushion support from FIG. 2 when assembled.

FIG. 4 again shows the cushion support 1 which has now been completed, in which each spring element 13 has been coupled to one of the connecting regions 9a-9d, 10a-10d. In the next step, the cushion support 1 is then integrated into the frame 101 of the backrest part 100 from FIG. 3.

Figure 5:
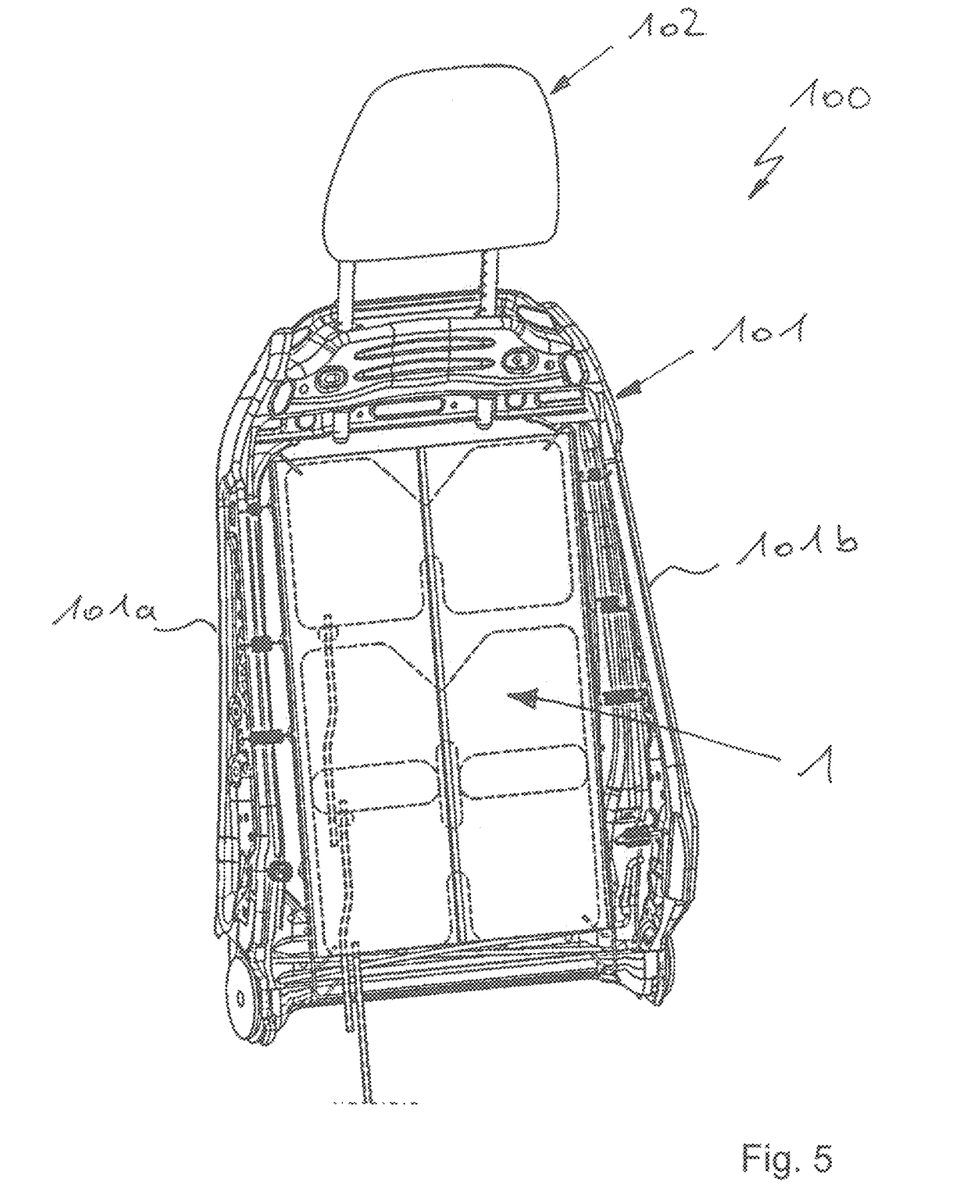
FIG. 5 is a perspective front view of a backrest part according to the invention as a combination of the frame from FIG. 3 and the cushion support according to the invention from FIGS. 1, 2 and 4.

FIG. 5 shows the structure of a backrest part 100 according to the invention, in which the cushion support 1 is arranged within the through-opening 103 between the two carriers 101a, 101b of the frame 101. For this purpose, the spring elements 13 were fastened to the two carriers 101a, 101b, on which holes (not visible in greater detail) are arranged for this purpose.

Figure 6:
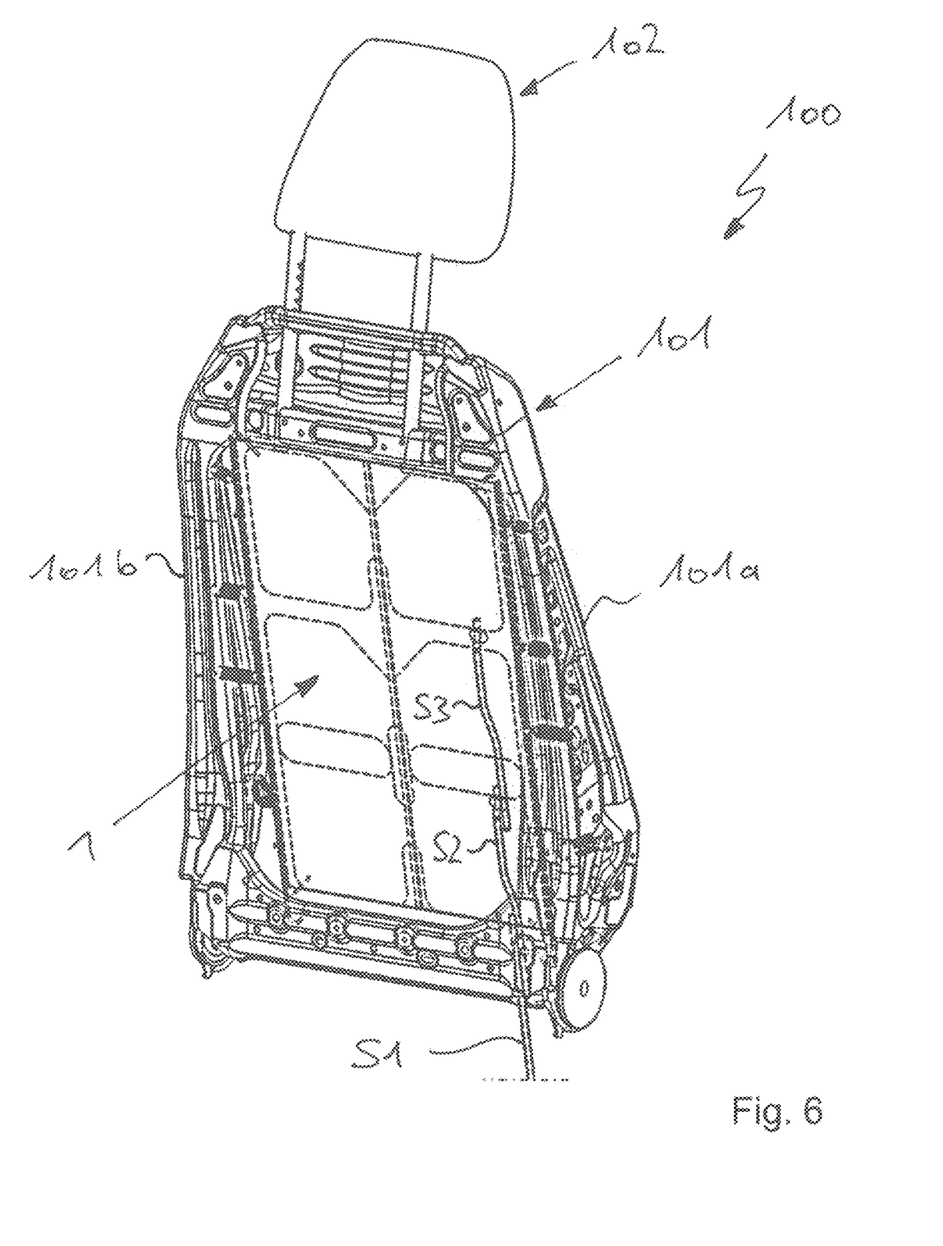
FIG. 6 is a perspective rear view of the backrest part according to the invention from FIG. 5.

FIG. 6 is another rear view of the backrest part 100 according to the invention from FIG. 5. As can be seen, the individual hoses S1-S3 are located in the rear region of the backrest part 101, from where they are in a fluid-conducting connection with a compressor assembly (not visible in greater detail).

Figure 7:
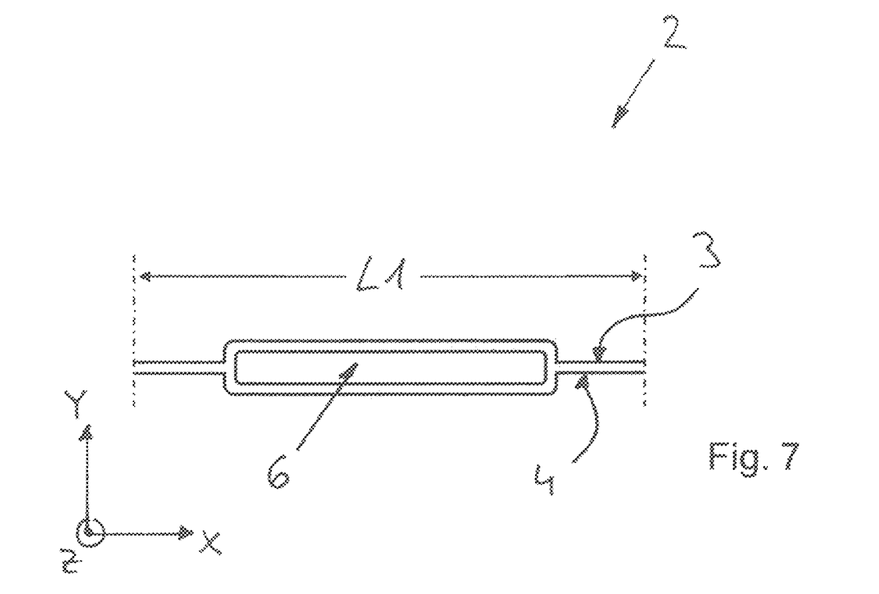
FIG. 7 is a section through a part of the cushion support in a first state.
Figure 8:
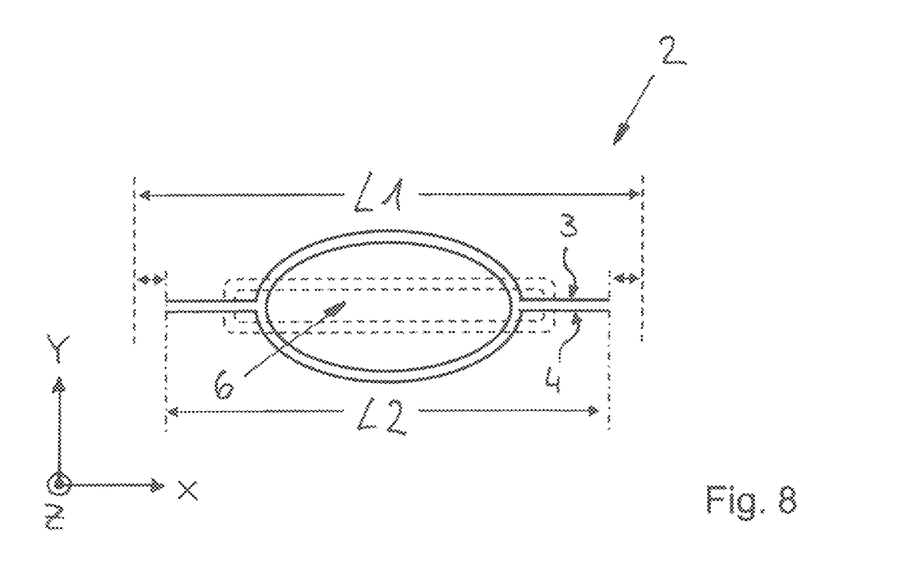
FIG. 8 is also a section through cushion support from FIG. 7 in a second state.

FIGS. 7 and 8 show the mode of operation of the expansion bodies 6-8 using the example of a single expansion body 6 shown schematically in section. FIG. 7 shows the initially unfilled or uninflated state of the expansion body 6 located between the two mat layers 3, 4. In the portion of the mat arrangement 2 shown here, this has a length L1 extending in parallel with the longitudinal direction X. By contrast, FIG. 8 shows the filled or inflated state of the expansion body 6. Owing to the cross-sectional increase of the expansion body 6 in parallel with the transverse direction Y, the two mat layers 3, 4 have increased curvature, as a result of which the portion shown has been shortened to a comparatively shorter length L2 compared with the length L1 shown in FIG. 7.

Figure 9:
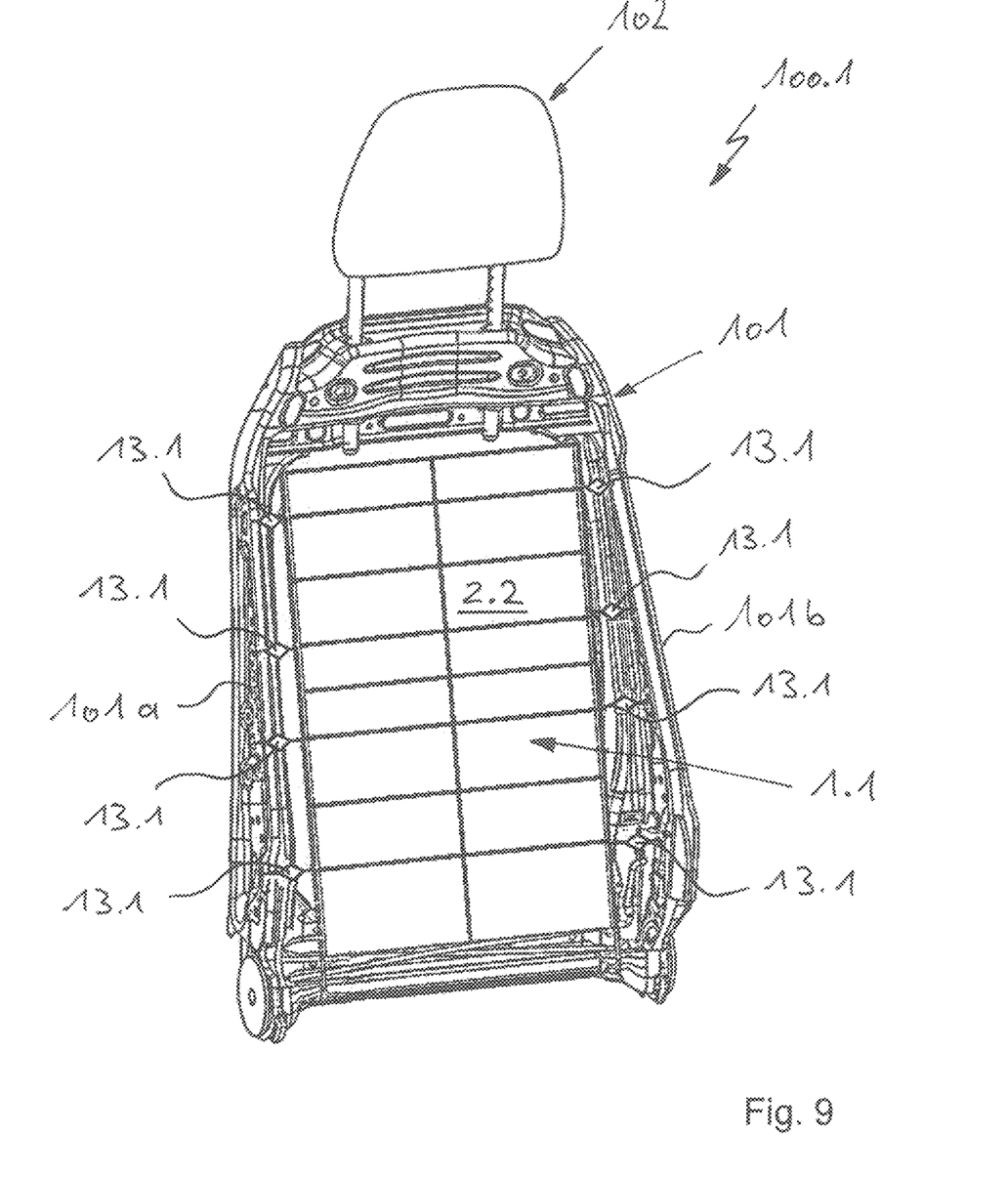
FIG. 9 is a perspective front view of another backrest part according to the invention in a variant as a combination of the frame from FIG. 3 and an alternative cushion support according to the invention.

FIG. 9 shows a backrest part 100.1 as a variant of the backrest part 100 from FIG. 5. In the present case, the support means arranged within the through-opening 103 between the two carriers 101a, 101b of the frame 101 are designed as a support mat 2.2. As can be seen, the support mat 2.2 comprises elements extending in the longitudinal direction and transverse direction, which may be, for example, wires and/or wave springs that are each spaced apart from one another in parallel.

Instead of the passive spring elements 13, active pneumatic muscles 13.1 are fastened to the two carriers 101a, 101b in order to attach the support mat 2.2 within the frame 101. By introducing a fluid into the pneumatic muscles 13.1, their initial length L1 (analogous to FIGS. 7 and 8) can be shortened to a comparatively shorter length L2, in order to increase the tension within the support mat 2.2. Said increase in tension is associated with noticeable rigidification of the shaped part (not shown in greater detail here) that is usually resting on the support mat 2.2. By contrast, the tension within the support mat 2.2 can be reduced by discharging the fluid from the pneumatic muscles 13.1 such that their shortened length L2 changes back to their normal length L1 (analogous to FIGS. 7 and 8).

LIST OF REFERENCE SIGNS

1—Cushion support
1.1—Cushion support
2—Mat arrangement of 1
2.2—Mat arrangement of 1.1
2a—Longitudinal edge of 2
2b—Longitudinal edge of 2
3—Mat layer of 2
4—Mat layer of 2
5—Cavity between 3 and 4
6—Expansion body of 1
6a—Cut-out of 6
7—Expansion body of 1
7a—Cut-out of 7
8—Expansion body of 1

8a—Cut-out of 8
9—Retaining rod of 1
9a—Connecting region of 9
9b—Connecting region of 9
9c—Connecting region of 9
9d—Connecting region of 9
10—Retaining rod of 1
10a—Connecting region of 10
10b—Connecting region of 10
10c—Connecting region of 10
10d—Connecting region of 10
11a—Seam of 2
11b—Seam of 2
11c—Seam of 2
11d—Seam of 2
11e—Seam of 2
11f—Seam of 2
12—Opening of 2
13—Spring element of 100
13.1—Pneumatic muscle of 100.1
100—Backrest part
100.1—Backrest part
101—Frame of 100
101a—Carrier of 101
101b—Carrier of 101
102—Headrest of 100
103—Through-opening of 100
L1—Length
L2—Length
M—Center line
S1—Hose of 6
S2—Hose of 7
S3—Hose of 8
X—Longitudinal direction
Y—Transverse direction
Z—Vertical direction

The invention claimed is:

1. A cushion support (1) for an at least partially resilient shaped back cushion support of a vehicle seat, the cushion support (1) comprising:
a support means designed for holding up and/or supporting a shaped part of the vehicle seat at least in regions; and
at least one expansion body (6-8) designed for reversibly displacing at least a region of the shaped part of the vehicle seat, the cross section of which body can be changed by introducing and discharging a fluid,
wherein the support means is a mat arrangement (2) which is mountable in a frame (101) of the vehicle seat and comprises two superimposed flexible mat layers (3, 4), each of the mat layers (3, 4) being formed by a textile, at least in regions, with the expansion body (6-8) being arranged between the mat layers (3, 4),
wherein the mat arrangement (2) comprises connecting regions (9a-9d, 10a-10d) which are arranged on two mutually opposite longitudinal edges (2a, 2b) and by means of which the mat arrangement (2) is at least indirectly connected to two mutually opposite carriers (101a, 101b) of the frame (101), and
wherein the connecting regions (9a-9d, 10a-10d) located on respective longitudinal edges (2a, 2b) are each formed by a deformed portion of a retaining rod (9, 10), the deformed portions of the retaining rods (9, 10) located between the mat layers (3, 4) in the region of the longitudinal edges (2a, 2b) are arranged through openings (12) provided at the longitudinal edges (2a, 2b).

2. The cushion support (1) according to claim 1, wherein the mat layers (3, 4) form at least one tubular and/or chamber-shaped cavity (5) therebetween, in which the expansion body (6-8) is arranged.

3. The cushion support (1) according to claim 1, wherein at least one of the longitudinal edges (2a, 2b) is formed by a fold or a connection of the mat layers (3, 4).

4. The cushion support (1) according to claim 1, wherein the two mat layers (3, 4) are interconnected along the retaining rods (9, 10) at least in portions by means of at least one seam (11a, 11b), the retaining rods (9, 10) each being arranged between the mat layers (3, 4) between one of the longitudinal edges (2a, 2b) and the at least one seam (11a, 11b) arranged in the region of said one of the longitudinal edges (2a, 2b).

5. A cushion support (1) for an at least partially resilient shaped back cushion support of a vehicle seat, the cushion support (1) comprising:
a support means designed for holding up and/or supporting a shaped part of the vehicle seat at least in regions; and
at least one expansion body (6-8) designed for reversibly displacing at least a region of the shaped part of the vehicle seat, the cross section of which body can be changed by introducing and discharging a fluid,
wherein the support means is a mat arrangement (2) which is mountable in a frame (101) of the vehicle seat and comprises two superimposed flexible mat layers (3, 4), each of the mat layers (3, 4) being formed by a textile, at least in regions, with the expansion body (6-8) being arranged between the mat layers (3, 4), and
wherein the expansion body (6-8) comprises at least one cut-out (6a-8a), the two mat layers (3, 4) being interconnected in the region of the cut-out (6a-8a).

6. A vehicle seat, comprising:
a seat part; and
a backrest part (100, 100.1) pivotally mounted on the seat part, wherein the backrest part (100, 100.1) comprises:
a support means designed for holding up and/or supporting a shaped part of the vehicle seat at least in regions; and
at least one expansion body (6-8) designed for reversibly displacing at least a region of the shaped part of the vehicle seat, the cross section of which body can be changed by introducing and discharging a fluid,
wherein the support means is a mat arrangement (2) which is mountable in a frame (101) of the vehicle seat and comprises two superimposed flexible mat layers (3, 4), the mat layers (3, 4) being formed by a textile, at least in regions, with the expansion body (6-8) being arranged between the mat layers (3, 4),
wherein the mat arrangement (2) comprises connecting regions (9a-9d, 10a-10d) which are arranged on two mutually opposite longitudinal edges (2a, 2b) and by means of which the mat arrangement (2) is at least indirectly connected to two mutually opposite carriers (101a, 101b) of the frame (101), and
wherein the connecting regions (9a-9d, 10a-10d) located on respective longitudinal edges (2a, 2b) are each formed by a deformed portion of a retaining rod (9, 10), the deformed portions of the retaining rods (9, 10) located between the mat layers (3, 4) in the region of the longitudinal edges (2a, 2b) are arranged through openings (12) provided at the longitudinal edges (2a, 2b).

* * * * *